United States Patent [19]

Baun, Jr. et al.

[11] Patent Number: 4,849,977
[45] Date of Patent: Jul. 18, 1989

[54] D-5 CHANNEL BANK CONTROL STRUCTURE AND CONTROLLER

[75] Inventors: Philip J. Baun, Jr.; Joseph F. Carriere; Stephen K. Eng, all of Andover, Mass.; Joseph E. Landry, Atkinson, N.H.; Jonghee Lee, Seochotong, D.P.R. of Korea; Thomas M. Nolan, Windham, N.H.; David C. Rhodes, Andover, Mass.

[73] Assignee: American Telephone and Telegraph Company AT&T Bell Laboratories, Murray Hill, N.J.

[21] Appl. No.: 86,013

[22] Filed: Aug. 17, 1987

Related U.S. Application Data

[62] Division of Ser. No. 788,322, Oct. 17, 1985.

[51] Int. Cl.[4] ............................................. G06F 11/10
[52] U.S. Cl. .................................................... 371/49
[58] Field of Search ............................. 371/49, 50, 51

[56] References Cited

U.S. PATENT DOCUMENTS

| | | | |
|---|---|---|---|
| 3,091,752 | 5/1963 | Randles | 371/51 |
| 3,102,253 | 8/1963 | Blodgett | 371/49 |
| 3,404,372 | 10/1968 | Robbins | 371/49 |
| 3,938,083 | 2/1976 | Stansfield | 371/51 |
| 4,271,521 | 6/1981 | Mahmood | 371/51 |
| 4,346,474 | 8/1982 | Sze | 371/49 |
| 4,476,350 | 10/1984 | Aull et al. | 179/70 |

Primary Examiner—Charles E. Atkinson
Attorney, Agent, or Firm—Henry T. Brendzel

[57] ABSTRACT

A channel bank unit for interfacing baseband user signals with a PCM carrier communications channel. The channel bank unit includes a circuit allowing verification of the transmission interity between the channel bank unit and external equipment having two-way communication with the channel bank unit. The circuit includes a first portion for evaluating the reception integrity of signals received from the external equipment and a second portion for imposing a parity sense on the signals transmitted to the external equipment that is related to the evaluation results of the first portion.

6 Claims, 8 Drawing Sheets

D-5 CHANNEL BANK CONTROL STRUCTURE AND CONTROLLER

This is a division of application Ser. No. 788,322 filed Oct. 17, 1985.

BACKGROUND OF THE INVENTION

It is well known that telecommunication signals can be transmitted over long hauls in digitally encoded form. Approximately in 1962, the T carrier system began to serve the U.S. metropolitan areas in conjunction with the D1 Digital Terminal System (DTS), and since then improved and more versatile digital terminal systems have been introduced.

The basic elements of a digital terminal system are the modulation, transmission, reception, demodulation, signaling, and testing subsystems. To perform the modulation and demodulation functions efficiently, the D1 system and all subsequent D type system (D2 through D4) have been organized in channel banks of two 12 channel groups, collectively called a digroup, with common control extended over the entire digroup. Modulation is performed by developing pulse amplitude samples of voice frequency signals and encoding the PAM samples into 8 bit PCM words. The PCM words of individual voice frequency circuits, or channels are time division multiplexed and the resultant multiplexed signal is applied to the digital transmission medium.

Although intially the D type channel banks are intended as interface elements between analog voice circuits and digital transmission facilities interconnecting central offices, their primary use changed substantially over the years. More and more the switching machines were converted to digital operation with stored program control and those machines employ direct interface equipment to link the T-carrier systems. These developments shifted the primary application of channel banks from handling interoffice message trunks to providing special service circuits.

One example of a special service circuit is one that allows a call to be made outside the local exchange area for the price of a local call. Another example is providing a digital computer-to-computer link.

One characteristic of special circuits (which is closely related to the nature of their use) is that they often are being rearranged. Unlike the message trunks, about twenty five percent of all special-service circuits are either installed, modified, or disconnected every year. This churning is expected to reach fifty percent in the near future.

Each of the circuits for these special services lines must be designed, set up electrically and tested before being turned over to a customer. This requires a substantial dedication of human resources with the existing D4 channel bank because there are many types of circuits, many different electronic modules that collectively create the circuits, and the electricl set-ups and testing of such circuits require substantial coordination between operating company personnel.

To overcome the labor intensive provisioning and testing operations, to enhance operation of the channel bank and to reduce costs, the D5 Channel Bank system was designed. From a macroscopic view and with reference to FIG. 1, the D5 channel bank includes a system controller 10 and a plurality of channel banks 20. The system controller provides access for local craft personnel and communication links to other systems and local craft persons, as well as control signals and test signals, via links 11, to channel banks 20.

Channel banks 20 comprise a controller, metallic access means, a clock unit, a power unit, a facility interface unit, and four digroups. Each digroup contains up to 24 channel units.

It is an object of this invention to provide channel units that are capable of interacting with controller 10 in a robust, error free, manner.

SUMMARY OF THE INVENTION

These and other objects are obtained with a channel unit that comprises a user port and a carrier port for interfacing users with a carrier system by converting user signals to a PCM format adapted for the carrier system, and vice-versa. In addition to other operational integrity check-out means, such as a metallic access port, the operation of the channel unit is checked by an arrangement that determines the parity of incoming PCM words and generates outgoing PCM words with the same parity sense. That is, incoming signals are checked to determine whether a transmission error occurred in the course of reception. The parity sense of the data transmitted with the outgoing PCM words in reflective, is then made to reflect that determination.

A clearer understanding of the invention may be had from the following detailed description and the accompanying drawings where:

DETAILED DESCRIPTION

Figure 1:
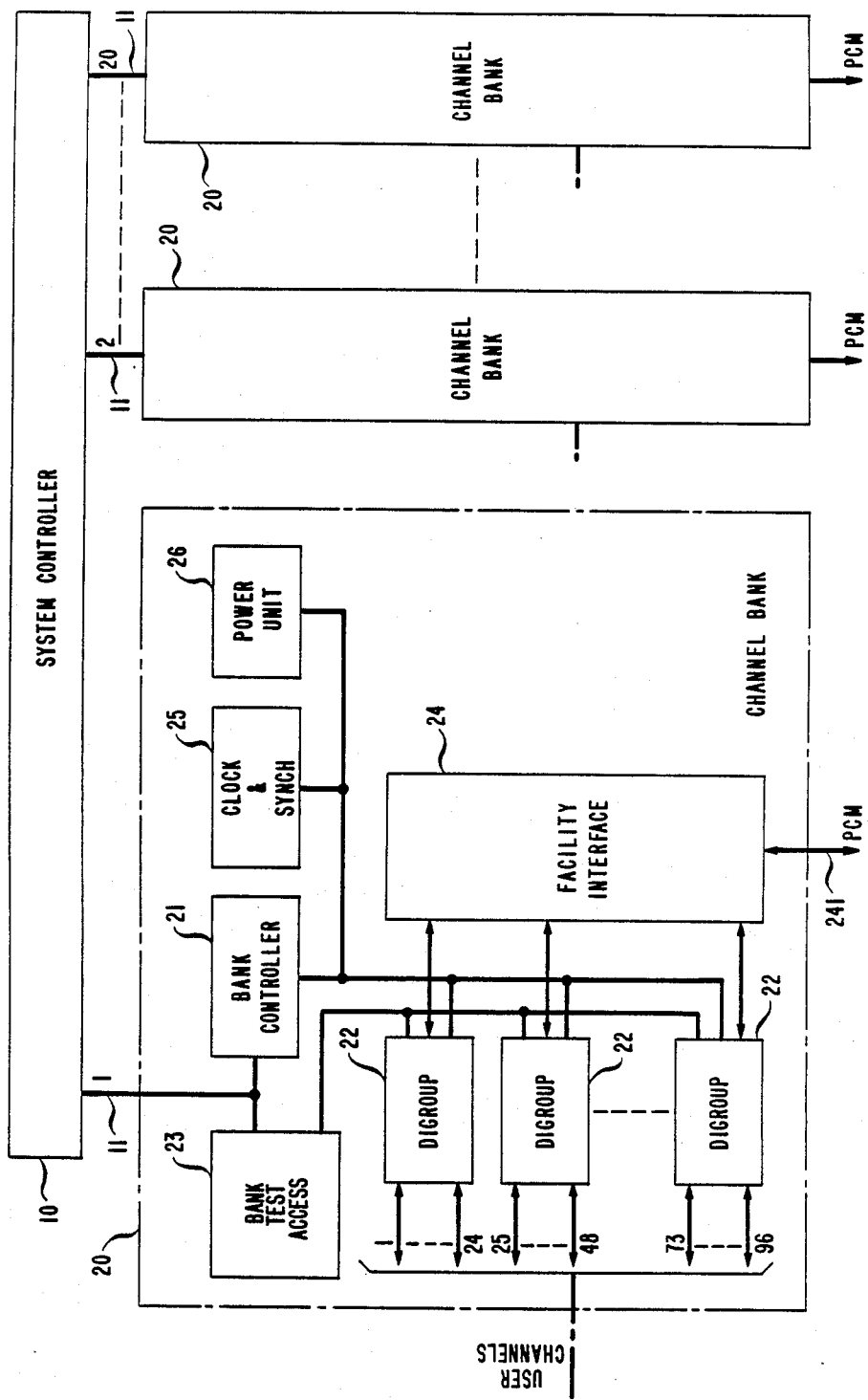
FIG. 1 is a general block diagram of the D5 channel bank system comprising a number of channel banks.

Channel bank 20, which is part of the channel bank depicted in FIG. 1, includes a bank controller 21 that interacts with system controller 10, up to four digroups 22 responsive to commands from controller 21 and a facility interface 24 that combines the digital output of digroups 22 to form a T-2 digital output (carrier) signal. The channel bank also contains a bank test access unit 23 that provides digital and metallic access for testing the channel units (also interacting with system controller 10), a clock and synchronization unit 25 responsive to bank controller 21, and a bank power unit 26. Bank controller 21 receives instructions from system controller 10 and after translation and reformatting sends instructions to other circuits in the bank.

Facility interface 24 performs multiplexing and demultiplexing operations. It multiplexes the output signals of digroups 22 and outputs the developed PCM signal onto line 241. It also demultiplexes the PCM signal incoming on line 241 and distributes it to digroups 22. In addition, facility interface 24 converts, as appropriate, the format of signals flowing between digroups 22 and PCM line 241.

More specifically in connection with the format conversions, facility interface unit 24 is designed to operate with one, two, or four digroups in a channel bank, providing an output rate of either 1.544 Mb/s, 3.152 Mb/s, or 6.312 Mb/s, respectively. When transmitting to line 241, facility interface 24 obtains its clock from bank clock and synchronization unit 25. It converts the unipolar bitstream from digroups 22 to a bipolar bitstream and clocks it onto line 241. When more than one digroup is handled by facility interface 24, it also adds control, stuffing, and framing bits, performs encoding of the signal, and scrambles the bits to improve the statistical properties of the PCM signal. This accounts for the fact that the above-mentioned rates are not multiples of each other. Facility interface 24 also provides cable equalization circuitry at the output to line 241, to compensate for cable lengths in the connection of interface 24 to cross-connect frames in the telephone company central office. Selection of the specific equalization is achieved through supply of operational parameters by bank controller 211, as dictated by system controller 10.

When receiving from line 241, facility interface 24 recovers the clock from the received signal. It then converts the bipolar signal into a unipolar signal and applies it to digroup 22. When the incoming signal is destined to more than one digroup, facility interface 24 also unscrambles and demultiplexes the signal into two or four bitstream signals using the stuffing, control, and framng bits inserted at the far end.

Figure 2:
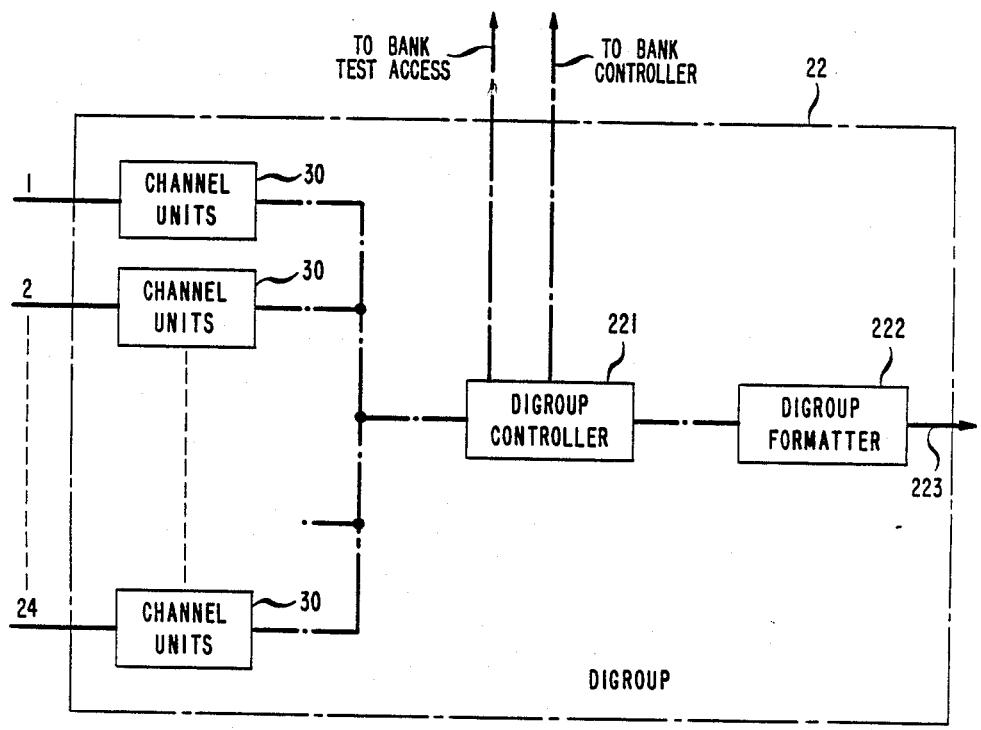
FIG. 2 is a block diagram of a digroup, which is part of each channel bank, including a plurality of channel units.

FIG. 2 presents a more detailed block diagram of digroup 22. It includes a digroup controller 221 and a digroup formatter 222, which make up the common equipment, and twenty-four channel units 30. Controller 221 is responsive to control signals arriving from bank controller 21 and it distributes the control signals to formatter 222 and channel units 30. Controller 221 is also responsive to bank test access unit 23 and it distributes test signals to channel units 30.

Digroup formatter 222 provides framing, performance monitoring, and rate conversion between the line rate going to facility interface 24 and the internal data rate.

In its interaction with channel units 30, digroup controller 221 provides the following: a) channel counting sequence to enable the various channel units to communicate with facility interface 24 via controller 221, digroup formatter 222, and line 223, and b) access to the PCM ports of channel units 31 by the bank test access unit 23.

In accordance with this invention, a channel unit 30 may be provisioned, or arranged, to perform many different functions that heretofore required specially designed channel units. Consequently, the number of different D5 channel bank units is much smaller than the number of different prior art (D4) channel units. Still, there may be different types of channel units 30 connected to a digroup controller 221.

Figure 3:
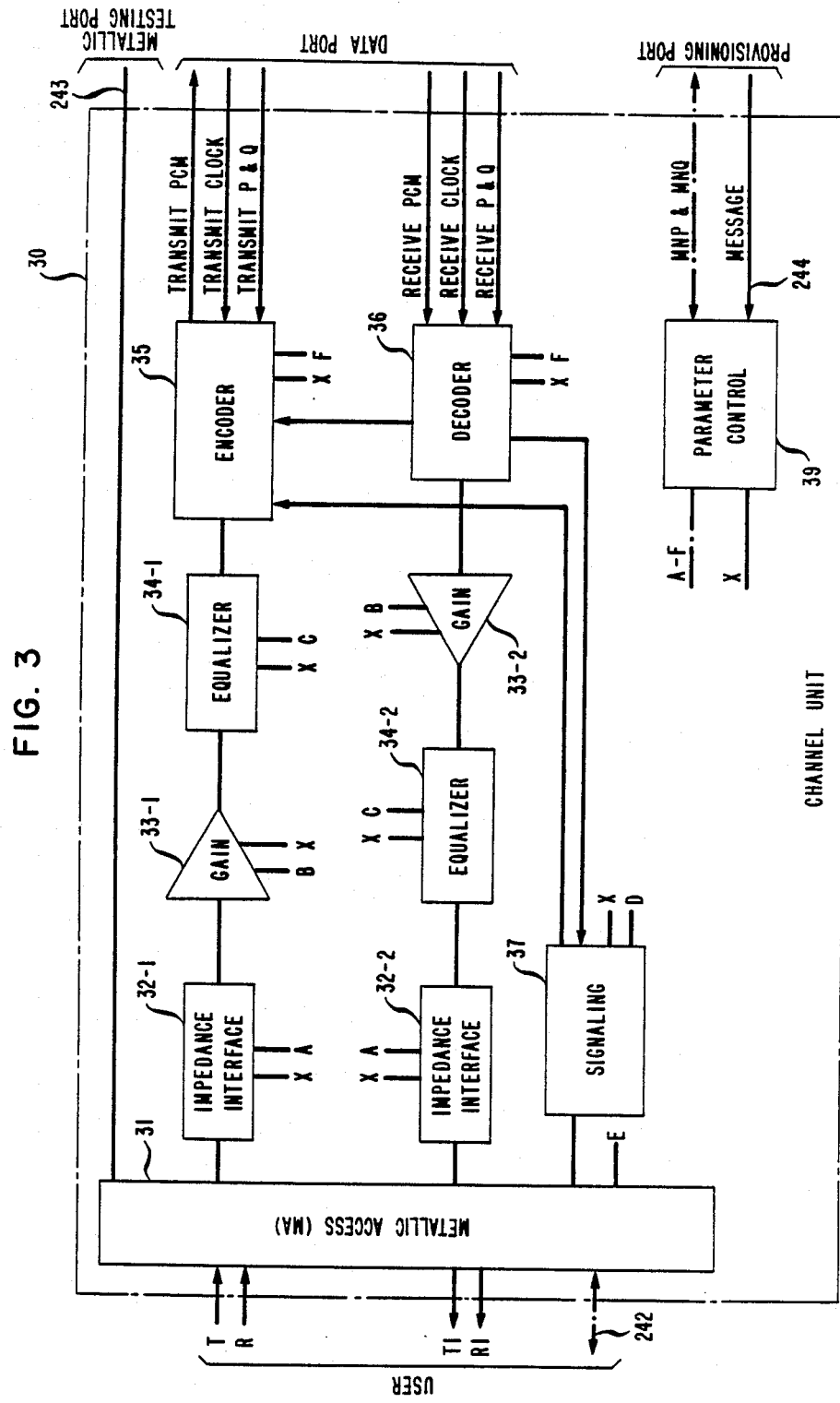
FIG. 3 is a more detailed block diagram of a channel unit shown in FIG. 2.

FIG. 3 illustrates one such channel unit. This channel unit is commonly known as a four wire unit because it contains two pairs of transmission leads going to the user: that is, T and R, and T1 and R1. In a context of this disclosure, a user may be a customer's telephone line or a switching machine's (e.g., a central office or a PBX) trunk line. The FIG. 3 channel unit is adapted for users that provide voiceband analog signals. Signals going to the user are provided by the channel unit in a balanced fashion across the T1 and R1 leads, and signals coming from the user are offered to the channel unit across the T and R leads, also in a balanced fashion. Also interfacing with the user is signaling bus line 242 that communicates signaling information between the user and the channel unit such as on-hook/off-hook information.

Other than the interface to the user, the FIG. 3 channel unit interfaces with test access unit 23 via a metallic testing port embodied by bus 243 in FIG. 3, bank controller 21 via a provisioning port containing message line 244 and enabling MNP-MNQ selection leads, and digroup controller 221 via a data port for communicating PCM encoded words to the carrier system. The data port includes Transmit and Receive PCM lines, Transmit and Receive clock lines, and Transmit and Receive leads.

The signal path for information flowing from the user to the carrier system includes leads T and R, metallic access (MA) block 31 for interfacing with test access unit 23, impedance interface block 32-1, gain stage 33-1, equalizer 34-1 and encoder 35. The signal path for information flowing the other way includes decoder 36, gain stage 33-2, equalizer 34-2, and impedance interface block 32-2. The output of impedance interface block 32-2 is applied to MA block 31, wherefrom the signals are connected to leads T1 and R1. Signaling information to and from uers, on bus 242, communicates via MA block 31 to signaling block 37 which interacts with encoder 35 and decoder 36. Block 31-37 are controlled by parameter control block 39 through common bus X and enabling lead A through F. In accordance with the principles of this invention, parameters control block 39 is able to dictate the operational parameters of the blocks interacting therewith in response to information supplied by bank controller 21, as well as to ascertain the value of the parameters resident in the channel unit and communicate them to bank controller 21. Parameter control block 39 communicates with bank controller 21 through a message bus 244, which is a serial bus, and two enabling control leads: MNP and MNQ leads.

Encoder 35 communicates with digroup controller 221 via the Transmit PCM digital line, the Transmit Clock, and the Transmit P and Q selection leads. Decoder 36 similarly communicates with digroup controller 221 via the Receive PCM digital line, the Receive Clock, and the Receive P and Q selection leads.

To better understand the operation of the FIG. 3 channel unit the following, in conjunction with FIGS. 4-10, describes each of the elements in the FIG. 3 channel unit in greater detail. Of course, the designs described are illustrative in nature and many modifications can easily be implemented by those skilled in the art.

IMPEDANCE INTERFACE BLOCK 32

Figure 4:
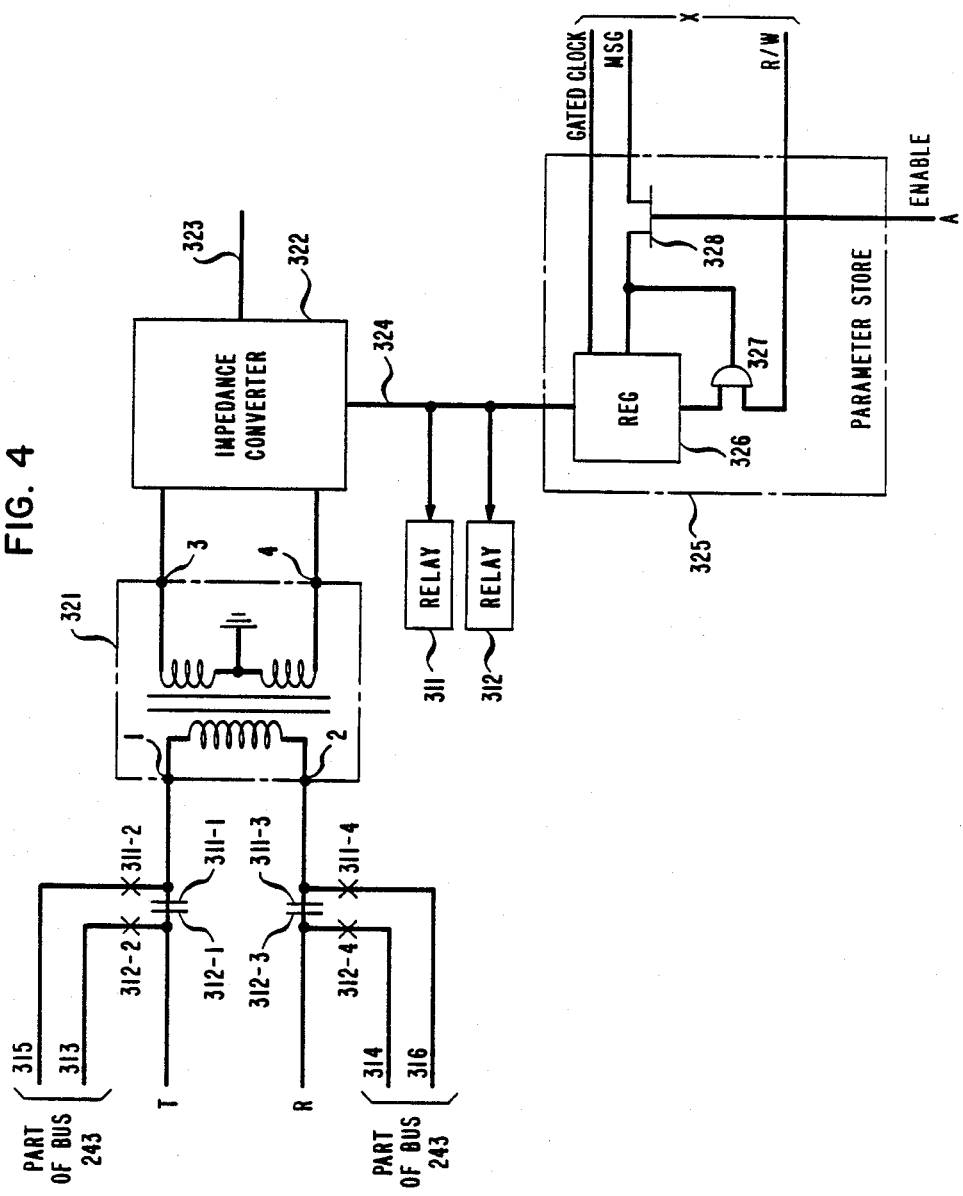
FIG. 4 is a diagram of impedance interface block 32 of FIG. 3.

Impedance interface blocks 32-1 and 32-2 can be identical in structure. Their function in the FIG. 3 channel unit is to present a balanced port for the user leads (T, R, T1 and R1) with a characteristic impedance controllable by parameter control block 39. FIG. 4 depicts one embodiment in impedance interface 32, and for the sake of simplicity, includes the relevent portion of MA block 31.

Lead T is connected to terminal 1 of the primary winding of balanced transformer 321 through normally closed contact 312-1 or relay 312 and normally closed contact 311-1 of relay 311. The R lead is connected to terminal 2 of the primary winding of transformer 321 via normally closed contact 312-3, of relay 312 and normally closed contact 311-3 of relay 311. Also connected to the T lead is lead 313 through normally open contact 312-2 of relay 312 and the R lead is connected to lead 314 through normally open relay contact 312-4 of relay 312. In a similar fashion, lead 315 is connected to terminal 1 of transformer 321 through normally open contact 311-2 of relay 311, and lead 316 is connected to terminal 2 of transformer 321 through normally open relay contact 311-4 of relay 311. Relays 312 and 311 (and their contacts) are part of MA block 31 and their function is to isolate the T and R leads from the channel unit, allowing thereby signals to be sent to the customer through lead 313 and 314 and separate signals to be sent to the remainder of the channel unit through leads 315 and 316. Leads 313-316 are part of signal bus 243 running from MA block 31 to metallic access unit 23. Transformer 321 has a secondary winding with terminals 3 and 4, and connected to terminals 3 and 4 is impedance converter circuit 322. The center tap is grounded. Impedance converter circuit 322 causes a specific impedance to appear across the T and R leads as directed by parameter control block 39 via bus X. The output signal of impedance converter 322 appears on line 323 and is applied to the appropriate following stage, e.g., gain element 33-1. Impedance converter 322 can be realized in a number of ways, e.g., merely with resistors switched in or out by means of relay contacts not unlike contacts 311. One particularly advantageous realization is described by Aull and Spires in U.S. Pat. No. 4,476,350, issued Oct. 9, 1984.

Bus 324 provides the necessary signals to control the impedance present by converter 323 (via transformer 321) to the T and R leads, and those signals are derived from parameter store block 325, which is connected to parameter control block 39 via bus X and enable line A. Bus X contains an MSG line, a gated clock, a Read/Write lead (R/W). The MSG line is connected to an FET switch 328 which, when enabled by line A, connects the MSG line to register 326. Register 326 is clocked by the gated clock signal. The parallel output of register 326 is applied to bus 324, while its serial output is connected to AND gate 327. Gate 327 is enabled with the R/W lead of bus X. In operation, when new information is sent to parameter store 325 from parameter control block 39, it is enabled with lead A, lead R/W is low, and the digits appearing on the MSG line are serially clocked into register 326 through closed switch 328. When parameter control block 39 wishes to be informed of the contents of register 326, parameter store 325 is enabled with lead A, the R/W lead is high and the gated clock shifts the contents of register 326 through AND gate 327. That information is clocked back into register 326 and is also cast upon the MSG line, to be read by parameter control block 39.

GAIN STAGE 33

Figure 5:
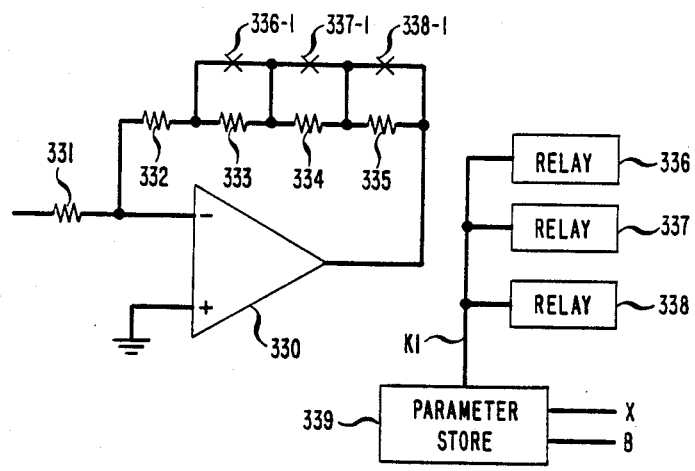
FIG. 5 is a diagram of gain stage 33 of FIG. 3.
Figure 6:
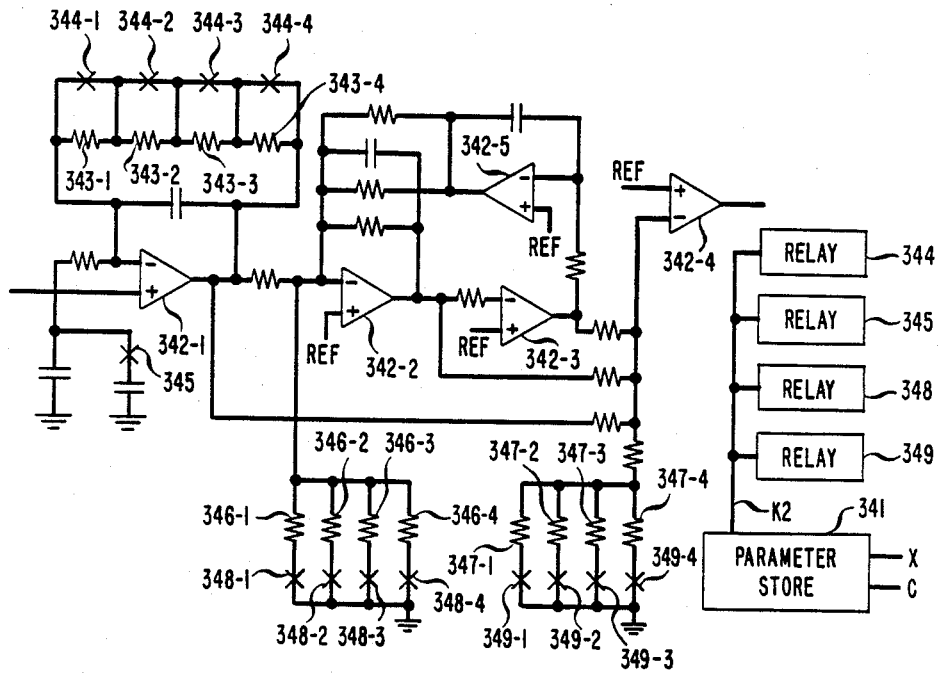
FIG. 6 is a diagram of equalizer block 34 of FIG. 3.

Gain stage 33, as depicted in FIG. 5, is a generic representation of gain stages 33-1 and 33-2. It comprises an operational amplifier 330, resistors 331 through 335, relays 336 through 338 (with associated normally open relay contacts 336-1 through 338-1, respectively), and parameter store block 339. Resistor 331 connects the input of gain stage 33 to the negative input of amplifier 330, while the positive input of amplifier 330 is connected to ground. Resistors 332 through 335 are serially connected and interposed between the negative input of amplifier 330 and its output. Relay contacts 336-1 through 338-1 are connected in parallel with resistors 333 through 335, respectively. The state of the relay contacts is controlled by bus K1, emanating from parameter store 339, which controls relays 336 through 338. Parameter store 339 is identical in construction to parameter store 325, described above, and like parameter store 325, it is responsive to bus X. Parameter store 339 is enabled by lead B.

In operation, the resistance of the series connection between the output of amplifier 330 and its negative input is based on the particular combination of closed relay contacts, and the value of that resistance determines the gain. Thus, by controlling relays 336 through 338, the gain of block 33 is determined.

EQUALIZER BLOCK 34

Equalizer 34 may be any conventional equalizer that is adapted for electronic control of its operational parameters. Channel units often use equalizers known as "bump equalizers" and that is the type of equalizer depicted in FIG. 6. It comprises operational amplifiers 342-1, 342-2, 342-3, 342-4, and 342-5 with various resistors and capacitors arranged in accordance with well-known design approaches. In addition and as part of the design, amplifier 342-1 has a series connection of resistors 343-1, 343-2, 343-3, and 343-4 interposed between its output and its negative input. Normally open relay contacts 344-1, 344-2, 344-3, and 344-4 are connected in parallel with these resistors, respectively. Also connected to the negative input of amplifier 342-2 are resistors 346-1, 346-2, 346-3, and 346-4. Connected in series with these resistors are normally open relay contacts 348-1, 348-2, 348-3, and 348-4, respectively, which effect connection of the resistors to ground. In a similar manner, resistors 347-1, 347-2, 347-3, and 347-4, are connected to ground through normally open relay contacts 349-1, 349-2, 349-3, amd 349-4, respectively, and arranged to affect the negative input of amplifier 342-4. The state of the relay contacts is controlled by bus K2, emanating from parameter store 341, which connects to relays 344, 345, 348, and 349 and communicates with parameter control block 39 via bus X and enable lead C. Parameter store 341 is identical in structure to parameter store 325.

SIGNALING BLOCK 37

Figure 7:
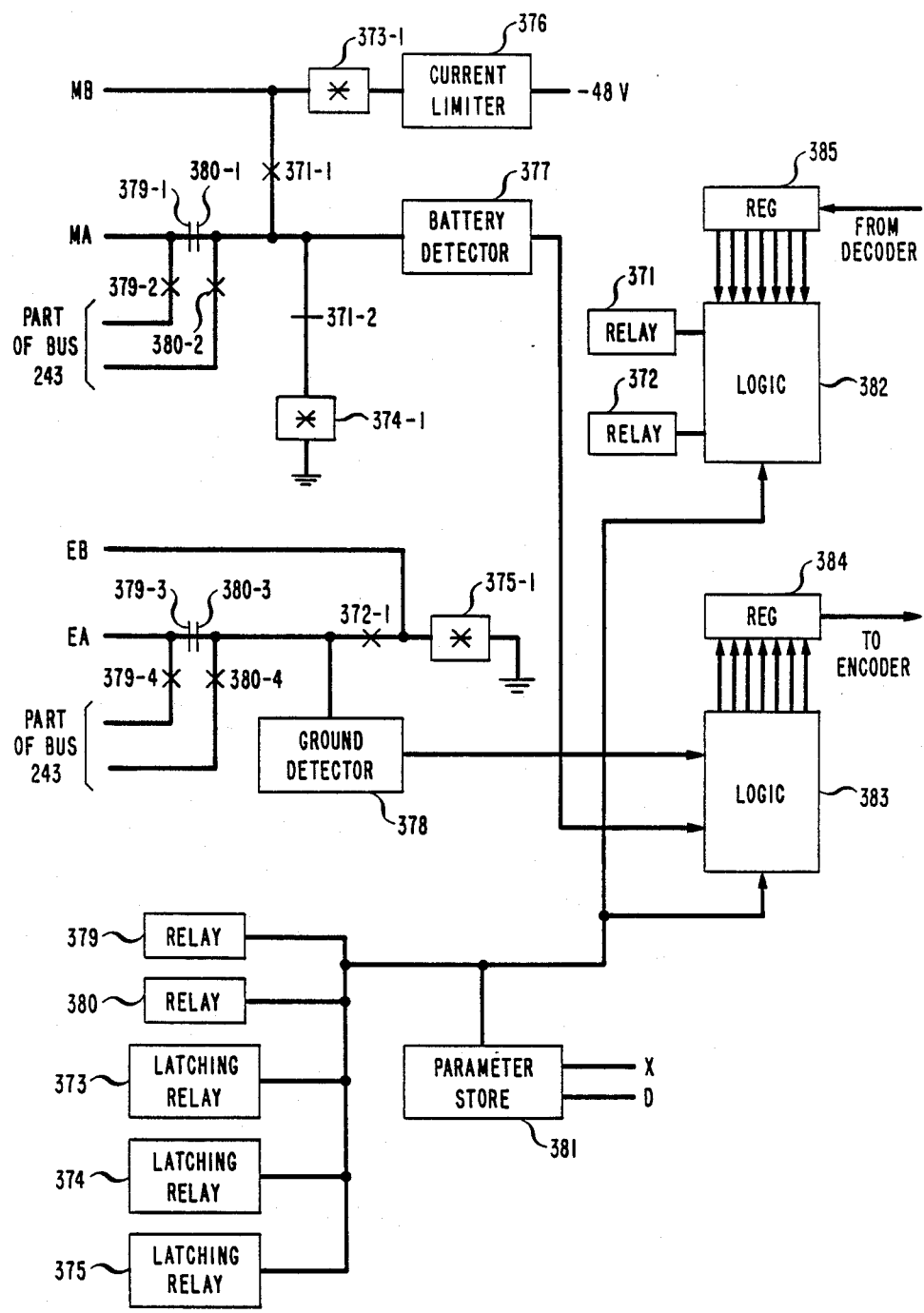
FIG. 7 is a diagram of signaling block 37 of FIG. 3.

In addition to the message signals, users provide and also expect, signaling information. An example of signaling information is the off-hook/onhook condition. This signaling information is communicated between the users and the carrier system via signaling block 37, whose block diagram is depicted in FIG. 7. For the sake of simplicity, FIG. 7 also includes the relevant portion of MA block 31.

The FIG. 7 signaling block provides to users the signaling lines MA, MB, EA, and EB. Line MB is connected to current limiter 376 through contacts 373-1 of latching relay 373. Current limiter 376 limits the current of an applied -48 volt supply. Line MA is connected to a battery detector circuit 377 via normally closed contacts 379-1 and 380-1 of relays 379 and 380, respectively. Battery detector circuit 377 is also connected to line MB through normally open contact 371-1 of relay 371, and still further connected to ground via a series connection of normally closed contact 371-2 of relay 371 and contact 374-1 of latching relay 374.

Line EB is connected to ground through contact 375-1 of latching relay 375, and to ground detector 378 through normally open contact 372-1 of relay 372. Line EA is connected to ground detector 378 through normally closed contacts 379-3 and 380-3 of relays 379 and 380, respectively.

Line MA, battery detector 377, line EA, and ground detector 378 are connected to bus 243 through normally open contacts 379-2, 379-4, 380-2, and 380-4, respectively.

The output of detectors 377 and 378 is applied to logic block 383. This output comprises the signaling information supplied by the user. Logic block 383 is a combinational logic block that develops an output signal which is placed in register 384 and sent to encoder 35.

Signaling information from decoder 36 is clocked into register 385 and the output of register 385 is applied to combinatorial logic block 382. The output of logic block 382 controls relays 371 and 372 which provide signaling information to the user via lines MA, MB, EA, and EB. Parameter store block 381 controls logic blocks 382 and 383 as well as relays 379, 380, 373, 374, and 375. Parameter store block 381, which is identical in structure to parameter store block 325, communicates with parameter control block 39 via bus X and enable lead D.

ENCODER 35

Figure 8:
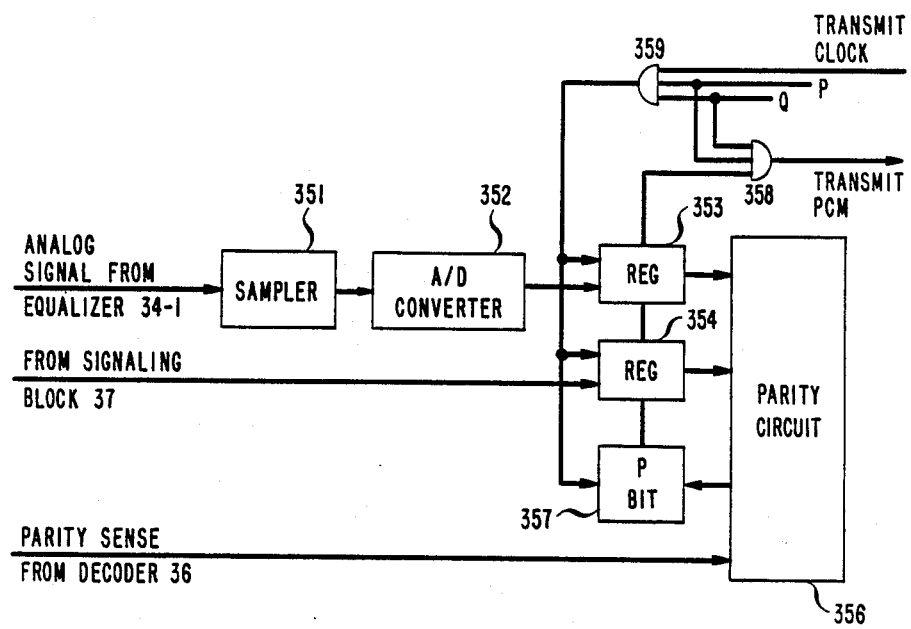
FIG. 8 is a diagram of encoder block 35 of FIG. 3.

FIG. 8 shows a block diagram of encoder 35. Sampler 351 connects the analog signal from equalizer 34-1 to A/D converter 352, where the signal is converted to pulse code modulated digital words. Sampler 351 and A/D converter 352 may be of any conventional design. The output of A/D converter 352 is applied in parallel to shift register 353, whose parallel output is connected to parity circuit 356. The serial input of register 353 is connected to shift register 354 which is fed by register 384 within signaling block 37, and its serial output is connected to AND gate 358. The parallel output of register 354 is also connected to parity circuit 356, and circuit 356 develops a parity signal based on the inputs from registers 353 and 354. The parity signal is stored in parity bit 357 which feeds a serial input of register 354. Whether the parity developed by circuit 356 is even or odd parity is dictated by a parity sense signal from decoder 36. The contents of registers 353, 354 and 357 are sent to a Transmit PCM line via AND gate 358 under control of a Transmit Clock gated through AND gate 359. Gates 358 and 359 are sensitive to enable leads P and Q, which are sent by digroup controller 221.

DECODER 36

Figure 9:
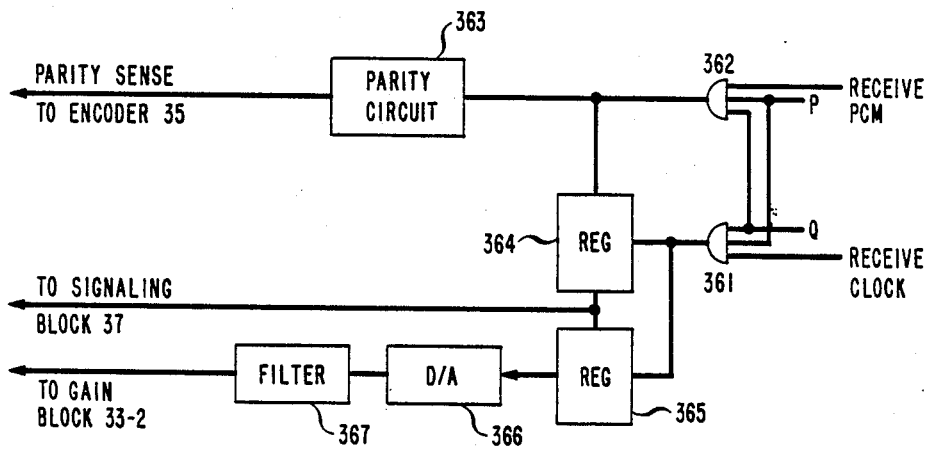
FIG. 9 is a diagram of decoder block 36 of FIG. 3.

FIG. 9 presents a block diagram of decoder 26. A Receive clock and a Receive PCM line are gated (with P and Q leads) through AND gates 361 and 362, respectively, with the gated PCM signal being sent to parity detector circuit 363 and to a series connection of registers 364 and 365. The gated clock signal is applied to the clock inputs of register 364 and 365. Parity detector circuit 363 is of conventional design, having its output sent to encoder circuit 35. In this manner there is a unique feedback from the Receive PCM signal to the Transmit PCM signal that checks on the transmission path to and from the channel unit, as well as on the parity detection hardware within the channel units. Whatever parity is detected on the incoming PCM words by circuit 363 and that same parity is generated by parity circuit 356 within encoder 35. That way, digroup controller 221 and bank controller 21 can check on the operation of the equipment by merely looking at the outgoing parity bits.

Register 364 stores arriving signaling information and register 365 stores data. Accordingly, the output of register 364 is sent to signaling block 37 and the output of register 365 is sent to D/A converter 366. The output of converter 366 is an analog signal that, after filtering through low pass filter 367, is sent to gain block 33-2.

PARAMETER CONTROL 39

Figure 10:
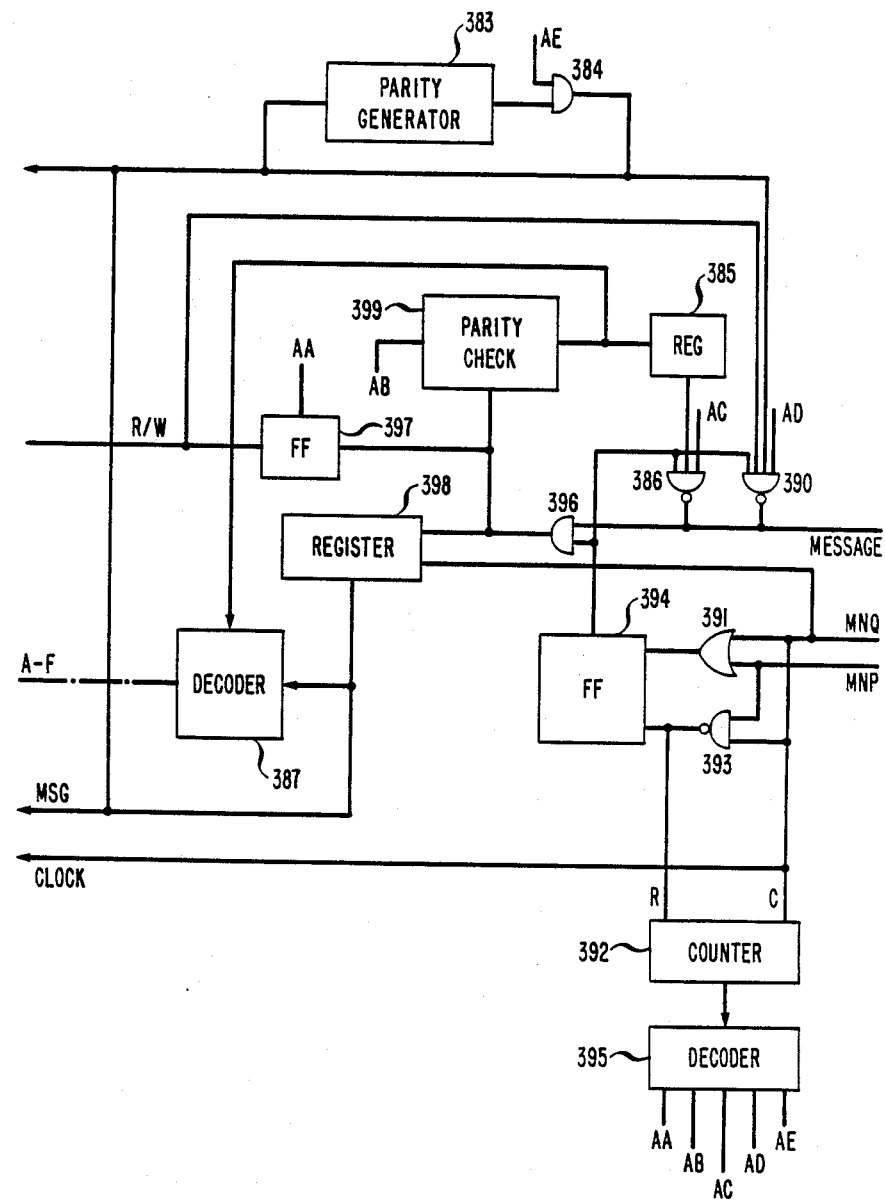
FIG. 10 is a diagram of parameter control block 39 of FIG. 3.

FIG. 10 presents a block diagram of parameter control block 39 which, in accordance with the principles of this invention, interfaces bank controller 21 (via digroup controller 221) with the various elements of channel unit 30 and provides for entering operational parameters into those elements. The interface to bank controller 21 comprises enable lead MNQ and MNP, and a bidirectional message line (MESSAGE). Enable lead MNP is normally at logic level 1 when the message line of the channel unit is not enabled. It goes down to logic level 0 to enable communications with the channel unit. Enable lead MNQ is similarly at logic level 1 when not enabling, but it becomes a gated clock when it is enabling. Enable lead MNQ is applied to OR gate 391, to NAND gate 393, to the gated clock line of bus X, to the clock input of counter 392. Enable lead MNP is applied to OR gate 391 and to NAND gate 393. The output of OR gate 391 is connected to the set lead of flip-flop 394, while the output of NAND gate 393 is connected to the reset lead of flip-flop 394 and the reset lead of counter 392. The output of flip-flop 394 is set when both MNQ and MNP assume logic level 0 and is reset when both resume logic level 1. Flip-flop 394, therefore, provides an enabling signal for the bidirectional message line and is accordingly connected to AND gate 396 and NAND gates 386 and 390. The output of counter 392 (which counts clock pulses) is applied to decoder 395 which, through simple combinatorial logic, develops appropriately timed enabled signals AA through AE.

The bidirectional message lines is applied to AND gate 396 which, as indicated above, is enabled with flip-flop 394. The output of gate 396 is applied to flip-flop 397 which, under control of signal AA, captures the first bit arriving on the message line through gate 396. This is the Read/Write bit of the arriving message, and it is fed to bus X. The output of AND gate 396 also feeds register 398 which stores the remaining bits appearing on the message, and parity check circuit 399. Under control of signal AB, the result of the parity check on the word coming through gate 396 is transferred to register 385 and decoder 387. The output of register 385 is sent back to digroup controller 221, through the message line, via NAND gate 386 which is responsive to gating signal AC. The output of register 398 is applied to decoder 387. Register 398 contains information that indicates both the element that needs to be accessed and the parameter value that needs to be placed in that element. Accordingly, decoder 387 is responsive to that portion of the register 398 contents that specifies the element to be accessed. The output of decoder 387 is enable leads A through E which are appropriately controlled by the output from parity check 399 to either inhibit or enable the transfer of data from bus X to the addressed element within channel unit 30. That portion of the contents of register 398 that specifies the parameter value is sent to the element, enabled by decoder 387, within channel unit 30 via bus X.

When the information appearing on the message line indicates a Read request, which is a request of the channel unit to read the parameters contained in one of the elements within channel unit 30, the MSG line of bus X is connected to the message line via NAND gate 390 which is responsive to the Read/Write bit of flip-flop 397 and to signal AD of decoder 395. The information applied to NAND gate 390 during a read operation is also applied to parity generator 383. A parity bit is output by generator 383 and is appended, through gate 384 with enable lead AE, to the information being read.

What is claimed is:

1. A circuit for encoding incoming user signals into an outgoing stream of digital words, each including an outgoing parity bit, and for decoding an incoming stream of digital words, each including an incoming parity bit:
    first means for sensing deviation of parity of said incoming stream of digital word; and
    second means for developing a parity for said outgoing stream of digital words responsive to said first means.

2. The circuit of claim 1 wherein said first means develops a sense output that is at one logic level when said parity of said incoming stream of digital words is even and at another level when said parity of said incoming stream of digital words is odd, and wherein said second means develops even parity when said sense output indicates even parity and develops odd parity when said sense output indicates odd parity.

3. The circuit of claim 1 wherein said outgoing digital words are PCM-coded representations of said incoming user signals.

4. A circuit for encoding incoming user signals into output digital words delivered at a transmission interface, each of said output digital words including an outgoing parity bit, and for verifying reception of input digital words incoming at said transmission interface, comprising:
    means for receiving said input digital words from said transmission interface;
    first means for evaluating parity of said input digital words;
    means for developing said outgoing parity bits for said output digital words that are related to said output digital words and to the parity evaluations of said first means; and
    means for applying said output digital words and said outgoing parity bits to said transmission interface.

5. Apparatus for receiving data from external equipment and for transmitting data to said external equipment comprising:
    first means for receiving data sent by said external equipment;
    second means for evaluating a parity sense of data received from said external equipment; and
    third means for developing a parity bit for each data word transmitted to said external equipment with a parity sense that is related to said parity sense developed in said second means.

6. Apparatus for receiving data from sending equipment and for transmitting data to said sending equipment comprising:
    first means for receiving data sent by said sending equipment;
    second means, responsive to said first means, for developing a reception error signal when parity of data received from said sending equipment is other than expected; and
    third means for developing a parity bit for each data word transmitted to said sending equipment with a parity sense that is related to said reception error signal.

* * * * *